United States Patent [19]
Miller

[11] Patent Number: 5,844,860
[45] Date of Patent: Dec. 1, 1998

[54] CONTINUOUS STRENGTH MEMBER

[75] Inventor: Howard A. Miller, Encinitas, Calif.

[73] Assignee: The United States of America as represented by the Secretary of the Navy, Washington, D.C.

[21] Appl. No.: 540,827

[22] Filed: May 23, 1990

[51] Int. Cl.$^6$ .............................. H04R 1/44; G01V 1/38
[52] U.S. Cl. .......................................................... 367/154
[58] Field of Search .............................. 181/112; 367/20, 367/76, 78, 106, 130, 153, 154, 191; 174/705, 101.5

[56] References Cited

U.S. PATENT DOCUMENTS

| | | | |
|---|---|---|---|
| 3,868,623 | 2/1975 | Abbott | 367/20 |
| 3,926,137 | 12/1975 | Johnson | 114/209 |
| 3,932,835 | 1/1976 | Abbott | 367/20 |
| 4,063,215 | 12/1977 | Abbott | 367/20 |
| 4,491,939 | 1/1985 | Carpenter | 367/20 |
| 4,660,183 | 4/1987 | McGowan et al. | 367/20 X |
| 4,716,554 | 12/1987 | Depew et al. | 367/20 |
| 4,734,891 | 3/1988 | McGowan et al. | 181/110 X |

*Primary Examiner*—Daniel T. Pihulic
*Attorney, Agent, or Firm*—Harvey Fendelman; Thomas Glenn Keough

[57] ABSTRACT

At least one vibration isolation module (VIM) and at least one acoustic sensor module of an elongate array are uniquely accommodated by a continuously extending, hose-shaped strength member dimensioned to define a space for noncompressively containing the acoustic sensor module and allow responsive sensing. The strength member has a nonelastic first portion to contain the length of the acoustic sensor module and includes a plurality of longitudinally extending juxtaposed cords. The cords are held in an equidistantly spaced side-by-side relationship by an appropriate fill-weave that assures sufficient flexibility. A coextensive portion of the strength member is fabricated from the plurality of longitudinally continuously extending juxtaposed cords to extend in an exaggerated sine wave configuration throughout the length of the VIM. A plurality of elastic warp bogies are disposed in-between the cords and are held in a side-by-side relationship by substantially the same appropriate fill-weave. The elastic warp bogies and sine wave configuration of the cords allow the strength member to be longitudinally stretched as it bears the array's dynamic drag. Increased loads can stretch the elastic warp bogies to a maximum length to where the cords carry any additional load. Opposite ends of the coextensive portion of the strength member are secured to the elastic sheath for load sharing with the sheath. Optionally, the VIM could be separate to accommodate existing arrays or other vibration isolation applications.

10 Claims, 5 Drawing Sheets

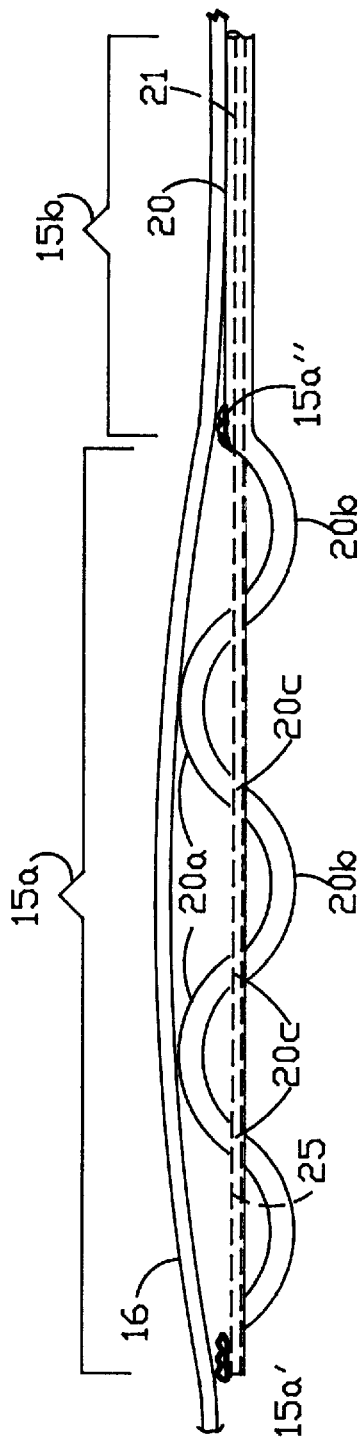
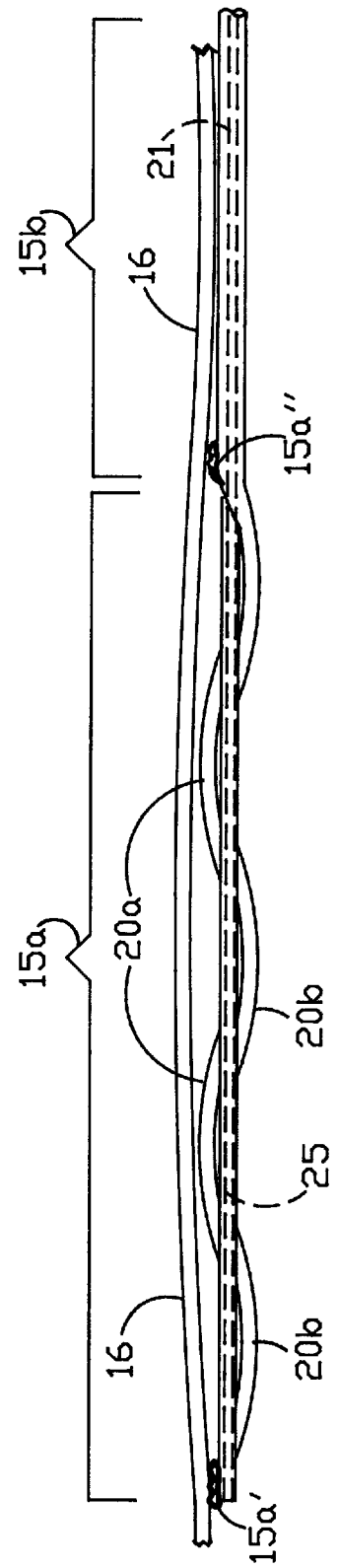

CONTINUOUS STRENGTH MEMBER

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED INVENTION

This invention is related to pending United States Patent and Trademark patent application Ser. No. 081,813 filed Jul. 30, 1987 by Howard A. Miller entitled "Sock Shaped Internal Strength Member For Towed Arrays".

BACKGROUND OF THE INVENTION

Elongate, hose-like towed arrays increasingly are being used for the acoustic sensing of an ambient phenomena of interest in the ocean. Typically, these elongate arrays have a number of sensor elements in modules along with their associated electronics and control leads contained within a hose-shaped structure that extends some distance through the water. Usually they are towed by a submerged or surface craft and, as a consequence, must include load bearing members incorporated in both the array and the vibration isolation modules (VIM) which are coupled to the sensor modules. Usually as the array is being towed through the water, each VIM elastically elongates while each acoustic sensor module retains a fixed length and spatial disposition. Most often, the acoustic modules and the VIMs have been joined together with a matched pair of metal end couplings which serve to pass tow loads from the strength member of one module to the strength member of the other. In addition these couplings contain mating electrical or optical connectors. A disadvantage of such an arrangement is that the end couplings contribute a significant source of array self-noise because they tend to scatter bulge-wave energy. The couplings also introduce added cost and reliability problems.

Another VIM design that elastically elongates in operation, includes an ultimate strength member in the form of a fairly large diameter Kevlar rope which is inserted with a number of service loops as a means of providing for the required slack as the array is towed. A disadvantage of this design is that the Kevlar rope loops occupy a considerable cross-sectional space which can be a significate problem in small diameter arrays. Furthermore, the large loops have been known to "grab" wires as the array elongates under load. A further disadvantage of this design is that this VIM construction does not incorporate present day lower cost array fabrication procedures.

Thus, there is a continuing need in the state of the art for an improvement to a towed array in which the load members do not overly compromise the array's acoustic performance and which does not induce excessive stresses and strains while the array is being deployed or retrieved.

SUMMARY OF THE INVENTION

The present invention is directed to providing an improvement for an elongate array of at least one vibration isolation module (VIM) and at least one acoustic sensor module having associated electronics contained in a hose-like elastic sheath for tensilely bearing the imposed load. A continuously extending, common hose-shaped strength member is dimensioned to define a space for noncompressively containing the sensors and electronics and having a thin wall to allow responsive sensing. The strength member is fabricated with at least one first section containing the length of an acoustic sensor module within plurality of longitudinally extending continuous juxtaposed cords. The cords are held in an equidistantly spaced side-by-side relationship by an appropriate fill-weave that assures sufficient flexibility. At least one coextensive section of the strength member is fabricated from the plurality of longitudinally extending juxtaposed cords that continuously extend in an exaggerated sine wave configuration to define inwardly and outwardly extending loops from the surface of the strength member throughout the length of the VIM. A plurality of elastic warp bogies are disposed in-between the juxtaposed cords in this coextensive section and longitudinally extends the length of the VIM. The cords and elastic warp bogies are held in a side-by-side relationship by substantially the same appropriate fill-weave that assures sufficient flexibility. The longitudinally extending warp bogies are of an elastomer, such as Spandex, that allows the strength member to be longitudinally stretched as it bears the drag load imposed by the array during towing. A further increase of the tow speed increases the load and causes the elastic bogies to be stretched to a maximum length as the loops in the juxtaposed cords are pulled straight. Straightening of the cords limits the length to which the elastic bogies can be stretched and transfers some of the towing force to the cords when their straightened length is reached. Because the opposite ends of the VIM section of the strength member are fitted within and appropriately secured to the elastic sheath, tensile dynamic load sharing occurs between the VIM section of the strength member and the adjoining elastic sheath.

A prime object of the invention is to provide an improvement for hose-shaped acoustic towed arrays.

An object is an improved strength member for a hose-like towed array.

An object is an improved strength member for a hose-like towed array configured to reduce array self-generated noise.

Another object is to provide an improved strength member in a hose-like array that does not compromise acoustic performance.

A further object of the invention is to provide for an improved strength member in a hose-like array that reduces failure inducing strains as the array is being deployed, towed or retrieved.

Still another object of the invention is to provide for an improved strength member of a hose-like acoustic array that provides for cross-sectional packing efficiency which is required of smaller diametered, next-generation arrays.

Yet another object is to provide a common strength member configuration for both VIM and acoustic sensor modules allowing for low cost fabrication technology to be applied to VIM construction.

Still another object is to provide a common strength member configuration for both VIM and acoustic sensor modules that shares the dynamic load with an elastic sheath.

Another object is to provide a common strength member configuration for both VIM and acoustic sensor modules that has exaggerated loops and elastic bogies that cooperate to provide a VIM capability.

Another object is to provide a VIM strength member structure which is an active element contributing to and enhancing overall VIM performance to eliminate the need for a separate load bearing elastic element.

These and other objects of the invention will become more readily apparent from the ensuing specification when

BRIEF DESCRIPTION OF THE DRAWINGS

FIG. 5a is a schematic cross-sectional side view of the invention with the VIM section having the strength member being represented by a single cord in an exaggerated sine wave-shape in the "unloaded" condition (or with the elastic warp bogies and the elastic sheath bearing the towing load). An acoustic sensor section is depicted with the coextensive portion of the cord lying in a substantially straight shape.

FIG. 5b is a schematic cross-sectional side view of the invention with the VIM section having the strength member being represented by a single cord of the strength member of the VIM pulled into a straightened, load bearing configuration to represent a maximum "loaded" condition with this cord and the others, not shown, bearing at least a part of the load with the elastic warp bogies and the elastic sheath. A coextensive portion of the single cord of the strength member in the acoustic sensor section is pulled substantially straight.

DESCRIPTION OF THE PREFERRED EMBODIMENT

Figure 1:
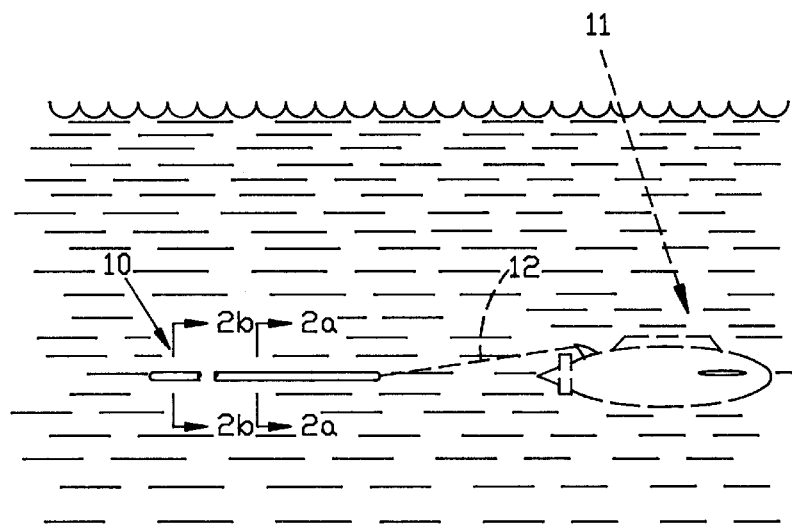
FIG. 1 is an isometric depiction of a long line towed array operationally disposed.

Referring now to FIG. 1 of the drawings, a typical elongate towed array 10 is operationally deployed behind a towing vessel 11 via a towing cable 12. Typically, such acoustic arrays have long been used for the sensing of an ambient phenomena such as acoustic pressure and their configurations are many and varied to provide a desired sensing and frequency response. Their lengths have been increased greatly over the years but their diameters are smaller as innovations continue in this field. One of the consequences of the greater lengths and smaller diameters, however, is that more capable and more space efficient load bearing members need be incorporated to overcome their drag. Another design consideration which has been met by the design disclosed herein is that the acoustic sensing properties of the array should not be overly compromised by the stronger more capable load bearing members.

Figure 2A:
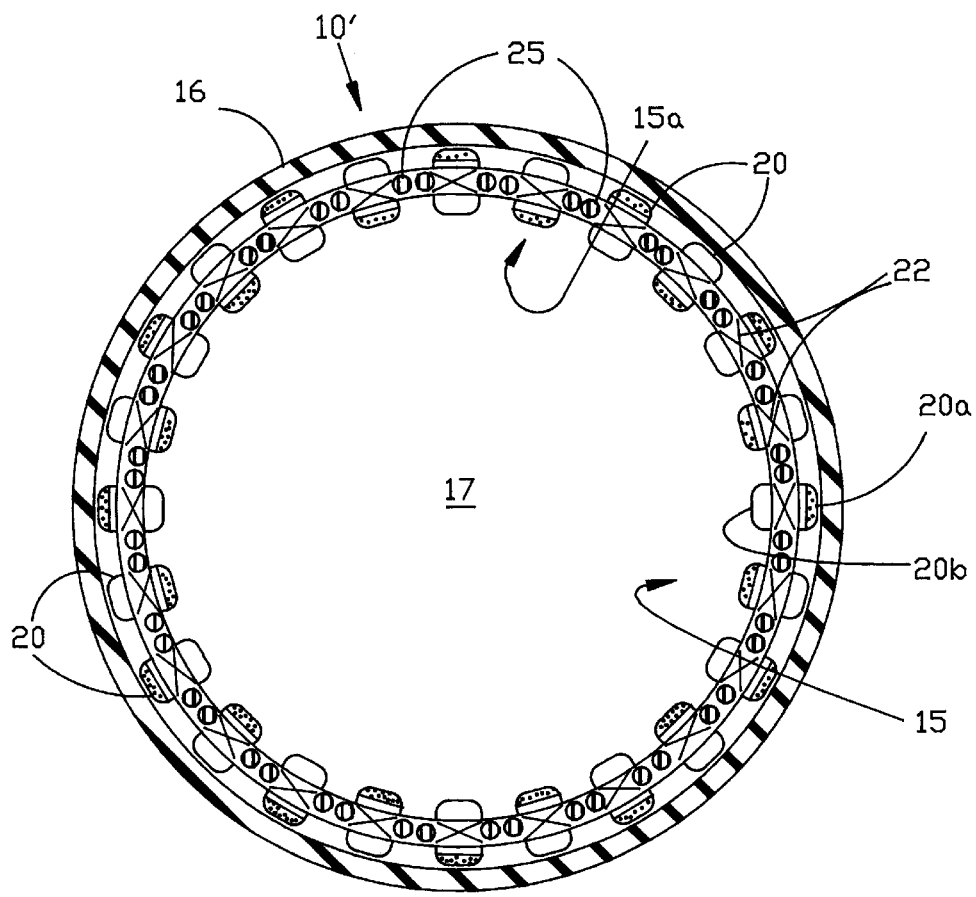
FIG. 2a shows a cross-sectional view of the array taken generally along lines 2a—2a through a VIM in FIG. 1.
Figure 2B:
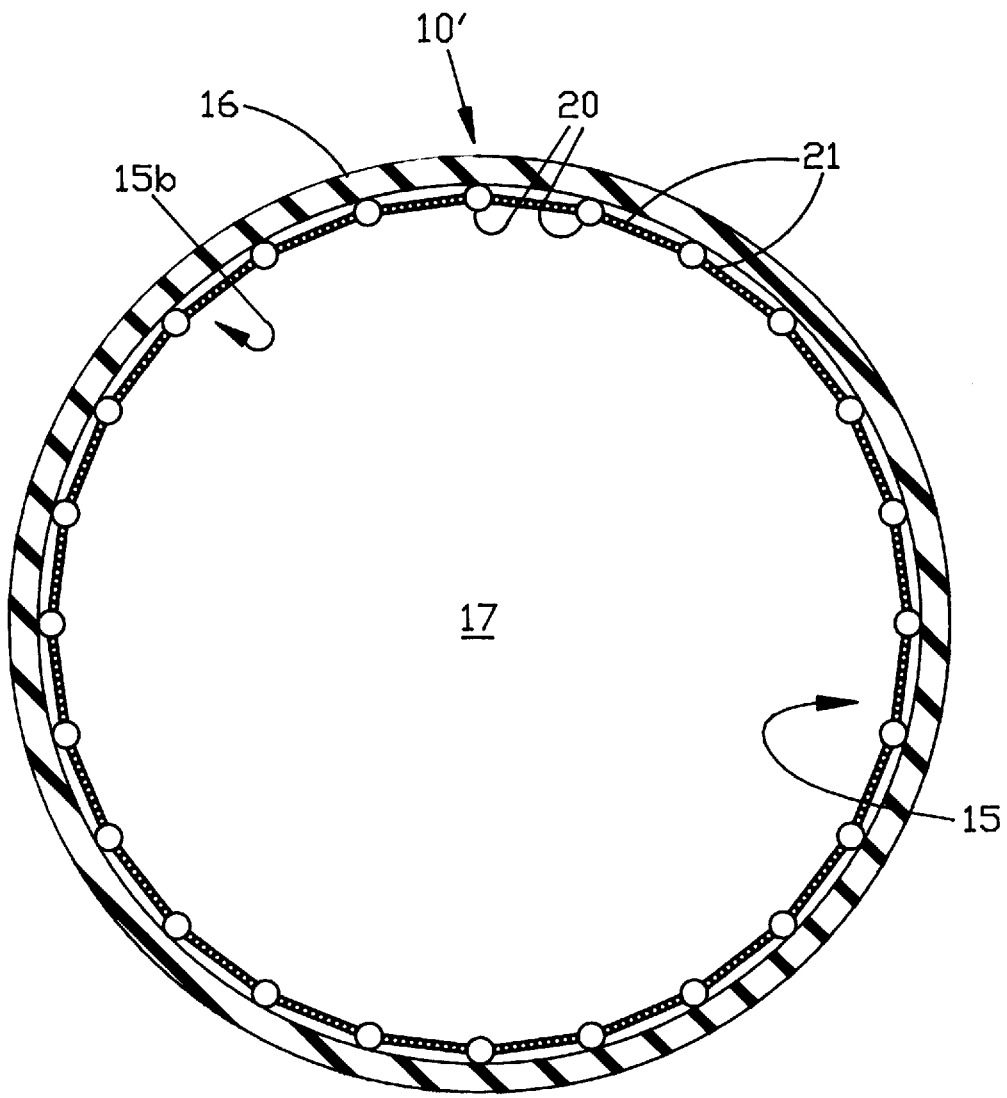
FIG. 2b shows a cross-sectional view of the array taken generally along lines 2b—2b through an acoustic module section in FIG. 1.

Looking now to FIGS. 2a and 2b, an improved array design 10' is provided with an improved load bearing member 15 which allows all vibration isolation modules (VIMs) of each array and all of the acoustic aperture sensors to be accommodated in a single continuous strength member. Benefits of such an array design are a reduction of array self-noise, an improvement in array reliability and a reduction in fabrication costs. An elastic outer sheath 16 is fitted about the load bearing member in a snug, but essentially non-compressive relationship to present a streamlined outer configuration that reduces the problems normally associated with excessive flow noise. The outer sheath is fabricated from an elastic material or elastomer that is free to elongate only over the VIM section of the array to help bear the towing load and to accommodate a maximum elongation of the VIM without failure. A variety of suitable rubber-like compounds could be selected for this purpose.

Figure 3:
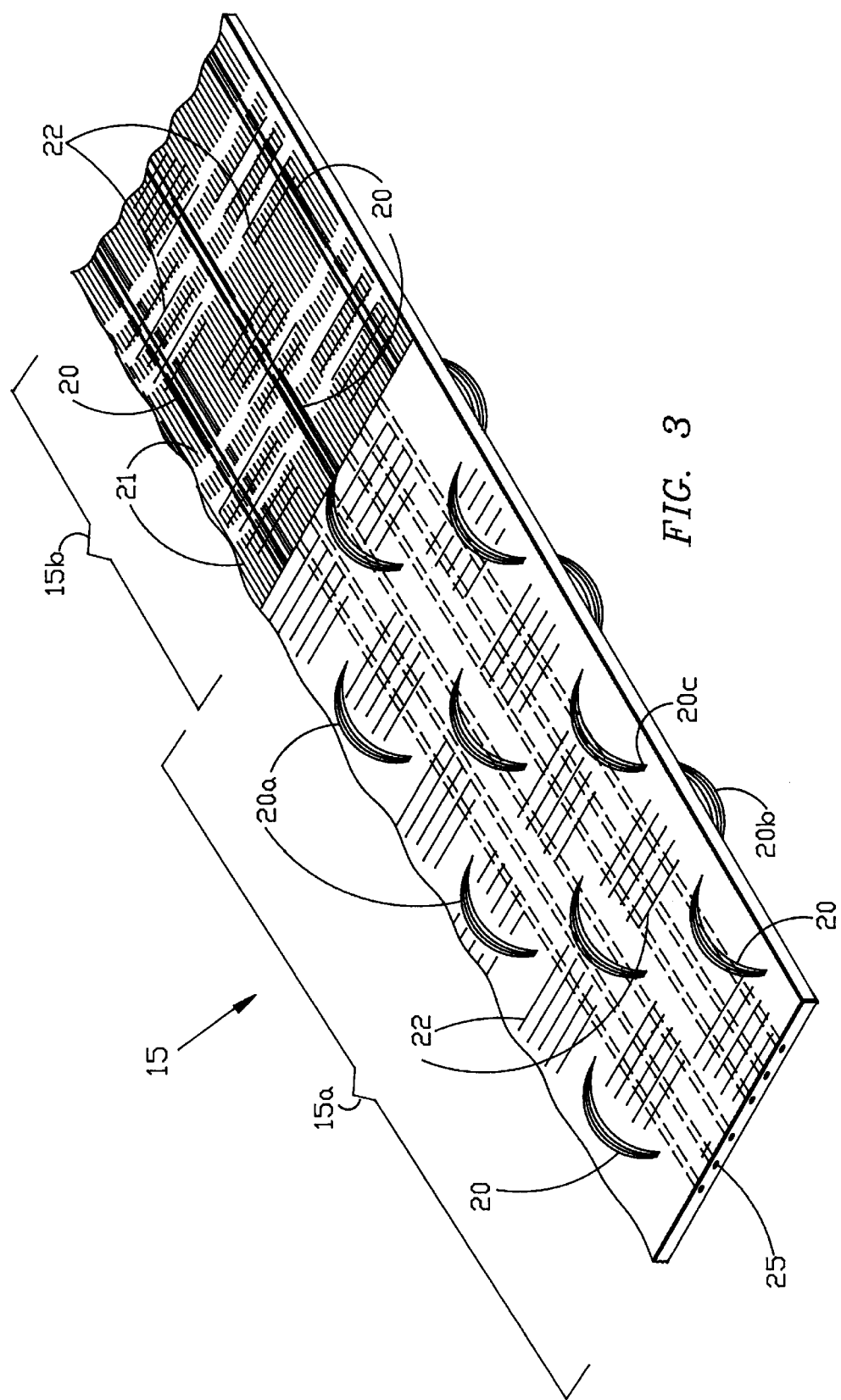
FIG. 3 shows a partial isometric depiction of the strength member of this invention partially in a flattened, shape prior to being sewn together into a tubular or sock-shape.
Figure 4:
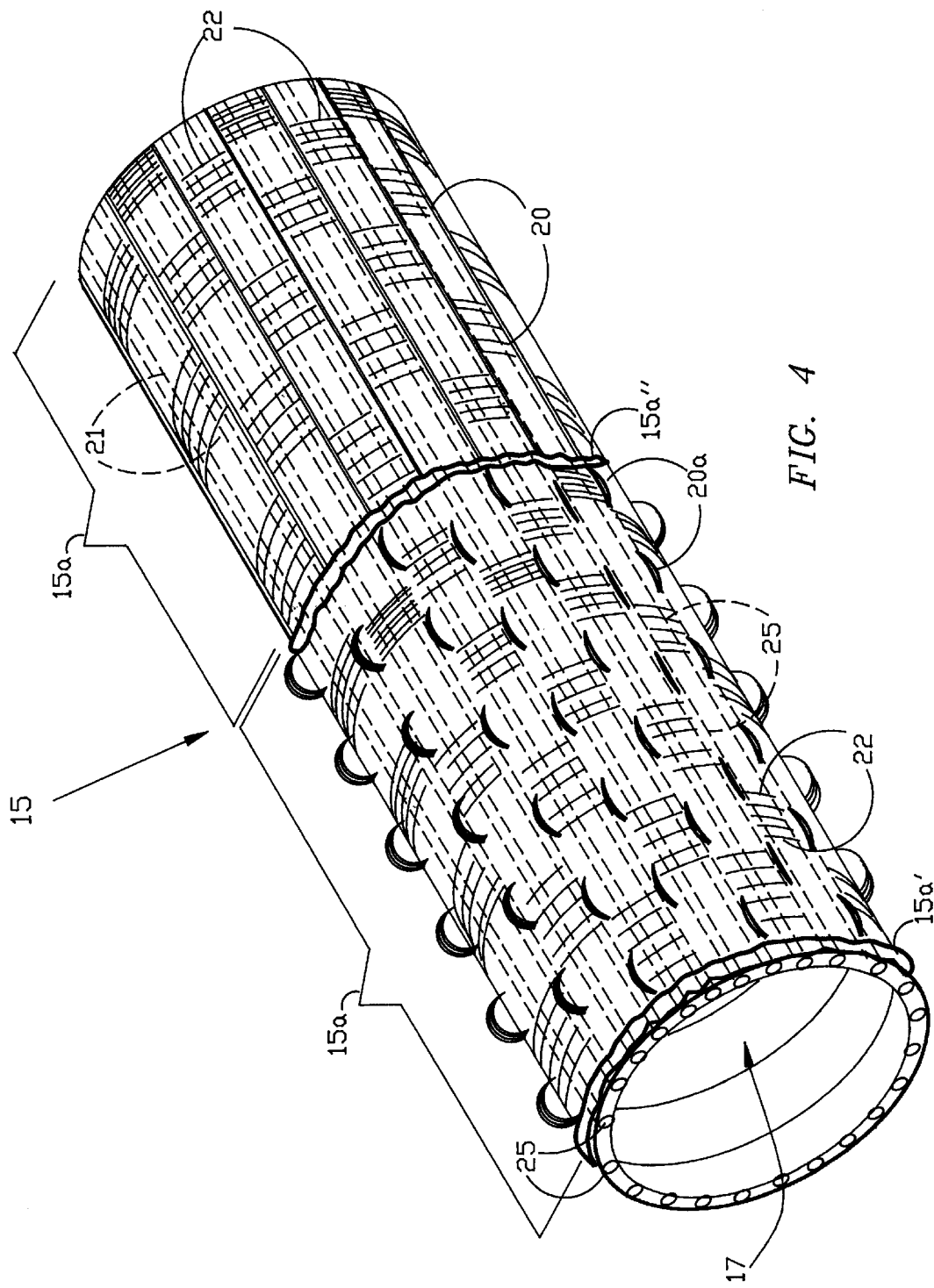
FIG. 4 shows an isometric depiction of the strength member of this invention with the edges joined together to form its "sockshape".

Load bearing or strength member 15 has a VIM section 15a and an acoustic module section 15b, see FIGS. 3 and 4. The member is configured and dimensioned to define a sufficient internal chamber 17 that has sufficient internal dimensions to contain the sensors, supporting electronics and necessary power and data carrying leads for the array in acoustic sensor module section 15b and also extends through a VIM section 15a. This chamber extends the length of the array so that the sensors electronics, cables, etc. are longitudinally, suitable disposed along the length of the hose-like array in accordance with a desired sensing capability. The remainder of the internal chamber usually is filled with a non-compressive filler material such as an appropriate oil, or it can be pressurized so that the overall structure of the towed array maintains a substantially rounded cross-sectional configuration throughout its elongate hose-shaped length. Improved strength bearing member 15 is fabricated so as not to exert any compressive loading on the elements contained in chamber 17. Preferably the transducer electronics, conductors, etc. are fitted within the internal dimensions of the strength member with a minimum of slack.

Strength member 15 is constructed in the form of a narrow woven tape-shape, see FIG. 3 with at least one VIM section 15a and at least one acoustic sensor module section 15b. The strength member is shown in a flattened configuration prior to being sewn together along a seam 15' into an essentially sock-shaped configuration as shown in FIG. 4.

Noting FIGS. 3 through 5b, running continuously through the warp (length) of the strength member throughout sections 15a and 15b are a plurality of small diametered strength member cords 20 held together by a fill-weave 22. The plurality of elongate cords are arranged in an equidistantly spaced, juxtaposed longitudinally extending relationship that goes the length of the strength member throughout the array.

Polyester warp bogies 21 are located between the cords and extend the length of each acoustic sensor module section 15b. These polyester warp bogies are non-elastic throughout each acoustic module section only. The acoustic sensor module section of the strength member is bonded to the outer elastic sheath throughout its length to help avoid the some of dynamic problems associated with towing an array.

In each VIM section, however, each of the cords additionally is provided with an integral and continuously extending series of loops 20a and 20b. Inwardly extending loops 20a and outwardly extending loops 20b along with an integral connecting part 20c define an exaggerated sine wave configuration as each cord reaches the length of each VIM section of the strength member. In other words, the series of inward loops 20a and outward loops 20b along with the integral connecting part 20c make up the total length of each elongate cord 20 where it passes through each VIM section, the purpose of which will be explained.

In an embodiment each of the cords 20 is formed of eight ends of yarn which are braided together. The braid of each cord is made to have two picks per inch to reduce the elongation of the finished strength member (a pick is where two ends cross). It has been found that if there are more picks per inch, there are more overlapping or ex-braided ends and consequently, more elongation or stretch when the strength member is under tensile load. One of the advantageous features of this improved strength member is that excessive stretch is avoided, where possible, to improve the operation of the sensor elements.

While braids of yarn have been described thus far, it is well within the purview of one skilled in the art to which this invention pertains to have the many strands of each cord running the entire length of any array without being braided. The strand, of course, would be gathered in ends. In a design found to be suitable for its intended application, eight ends of an aramid fiber such as that marketed under the trademark Kevlar were fashioned in a one/one braid for each cord. Other fibers such as polyethylene marked under the trade name Spectra might be used. Each of the ends contain 3,000 denier braided one/one in a single braid. Such a configuration assures a relatively thin wall design for the strength member that does not overly compromise the acoustic sensing capabilities of the sensor elements.

The overall number and dimensions of cords used are specifically tailored to the total towing load requirement and to the diameter of the sensors and electronic elements being contained so that they are contained without the cords exerting a compressive force on them. A desired hand or softness in the strength member is assured by a fill-weave 22 which holds adjacent cords together.

Although cords 20 and polyester yarn of fill-weave 22 are continuous throughout strength member 15, each VIM section 15a additionally includes elastic warp bogies 25, see FIGS. 2a, 4, 5a and 5b (no polyester warp bogies 21 are included in each VIM section). The elastic warp bogies, for example, may be the material known as Spandex, and are introduced during the weaving process in such manner that the cords in that section are forced into the above referred to exaggerated sign wave shape as it passes through the thickness of the woven structure. This special structure gives VIM section 15a of strength member 15 the ability to elastically elongate. As elaborated on below, polyester fill-weave 22 is used throughout the strength member and is woven using an alternately reversing twill weave pattern to producing a soft hand (flexibility) in the finished sock.

In other designs such cords were held in their longitudinally extending side by side relationship by being woven together with polyester fills. An over/under weave of polyester fills goes over a first cord, under its adjacent cord, over the next cord, under the next cord and so on. Its adjacent fill was opposite this sequence as it goes under then over and so on. These and other alternating fills were adequate to shape the longitudinally extending cords in a tube-like shape when it was sewn together in the seam. The side-by-side longitudinally extending cords and over and under wrap of the polyester fills helped alleviate some of the problems of the state of the art but still were not satisfactory. This weave was found to create an unduly stiff strength member. This stiffness created kinking in the reeled array that crushed the sensor elements. Also, a relatively rigid surface was created that tended to over stress the sensing elements when the array passed over a sheave during deployment and retrieval.

A preferred weave for the cords 20 is the twill pattern, fill-weave 22 woven between adjacent cords. This fill-weave each included four ends of polyester per fill and are provided to laterally reach across the cords and be woven of polyester in a successively staggering twill design that alternates between adjacent cords. Six warps ends are woven with the fills between adjacent cords. Other warp ends are woven in the staggered alternately reversed twill pattern between cords.

This well known weave design was incorporated in this strength member to give the structure an acceptable hand for the strength member. This design allowed a degree of softness and handling which did not unduly create failure inducing stresses nor overly interfere with the array's acoustic properties.

The invention is used to construct a unique towed array and has a continuous strength member in which the VIM and acoustic sensor module sections are contained within a continuous length of outer elastic sheath 16, see FIGS. 5a and 5b. The sheath is bonded to the strength member at both ends 15a' and 15a" of each VIM section 15a so that the sheath wall over the length of the VIM and the elastic warp bogies 25 of strength member 15, carry the array drag load until the cords 20 are straightened (bottomed out, see FIG. 5b). At this point, the additional load is carried by cords 20 in VIM section 15a. Under this condition, the load is borne by the elastic sheath, the elastic warp bogies and the cords. In comparison, cords 20 and bogies 21 of the strength member of each acoustics module section 15b bear the towing load at all times (with an indeterminable portion of the load being carried by the sheath which is completely bonded to the acoustics module section of the strength member).

In this invention the VIM section of the strength member is an active element contributing to VIM and acoustic sensor module performance. The elastic warp bogies contribute to acoustic module performance by helping to acoustically decouple the acoustic sensors from the towing structure (tow cable). The elastic warp bogies contribute to VIM performance by assuming a portion of the array drag load. VIM attenuation properties are further enhanced by the nature of the spandex which is polyurethane, a lossy material. There is additional energy absorbed by structural resistance in the weave as the cords and the elastic (Spandex) bogies tighten and put a bending load on the polyester fill yarns, see FIG. 5b. By selection of the size and number of bogies and the length of the cords, the tow speed at which the VIM bottoms out can be controlled.

The vibration isolation module and acoustic array are contained uniquely within a continuous length of sheath and share a common strength member. This is significant in that it not only eliminates a costly connector with its associated alignment and reliability problems, but also reduces array self-noise by eliminating one of the more severe sources of bulge-wave scattering, the coupling. The cross-sectional packing efficiency is such as to accommodate the smaller diametered next generation arrays. A common strength member configuration is provided for both VIM and acoustic aperture sensing elements to allow a low cost acoustic module fabrication technology to be applied to VIM construction. VIM strength members structure is provided which is an active element contributing to an enhancing overall VIM performance. This does away with the need for separate load bearing elastic elements. Other materials such as nylon cord or yarn or rubber cord could be substituted for the VIM sock bogies. The polyester used in the fill as acoustic sock bogies could be replaced by several high tenacity materials. The weave pattern can be changed to enhance its structural resistance or to produce a different hand to the sock in accordance with well accepted weaving techniques widely known throughout the industry. The ultimate strength member cords could be made of other high tenacity fibers having sufficient strength and fatigue resistance. They could also be yarn bundles or twisted cords. The sock could be fabricated in two or more discreet sections and spliced together.

FIGS. 5a and 5b show termination interconnections 15a' and 15a" at opposite ends of each VIM section. These termination interconnections connect the cords, elastic bogies and fill weave together and connect the opposite ends of the VIM section to the elastic sheath.

Another feature of this inventive concept is that the opposite ends of the cords at the extreme ends of the strength member may be braided back on themselves in eye-splices to form termination loops as referred to in the above referenced related invention. This termination scheme does not compromise the strength of the cords as the contemporary clamping arrangements tend to do. The eye splice termination loops may be wrapped about pins which are connected to another array or a towing cable or a drogue chute. The dimensions of the pins may have to be small since they too may have to be contained in the hose-like sheath. The small diameters of the braided portions of the plurality of cords allow accommodation of small diametered pins without creating a weakest-link part of the composite cord structure. The termination loops may all be the same length to engage a single pin if desired or have different lengths to engage a number of appropriately spaced pins.

The invention thusly described has concerned itself with the providing of coextensive VIMs and acoustic sensor modules. The VIM can be used as a separate unit, if desired. In other words, the configuration of the VIM could be fabricated as a separate unit and suitably coupled to associated acoustic sensor modules by conventional means, such as the coupling arrangement disclosed in the above referred to related invention. This capability allows the retrofitting of some arrays to include this VIM and provides for the application of this VIM to related or other uses which may become apparent to one having the need for such a design.

Obviously many modifications and variations of the present invention are possible in light of the above teachings. It is therefore to be understood that within the scope of the appended claims the invention may be practiced otherwise than as specifically described.

I claim:

1. An improvement for tensilely bearing the dynamic drag load of an elongate array including at least one vibration isolation module (VIM) section and at least one acoustic sensor module section provided with an internal filled chamber, the sections contained in a hose-like elastic sheath comprising:

a continuously extending, common sock-shaped strength member longitudinally extending within said hose-like elastic sheath being dimensioned to define a space for noncompressively containing said internal filled chamber, said strength member is fabricated with at least one first section fabricated from a plurality of longitudinally extending juxtaposed cords continuously extending the length of said first section to contain the length of said acoustic sensor module, said strength member further is provided with at least one coextensive section fabricated from said a plurality of longitudinally extending juxtaposed cords continuously extending in an exaggerated sine-wave-shape in an spaced-apart relationship in said coextensive section and a plurality of elastic warp bogies disposed in-between said juxtaposed cords and longitudinally extending the length of said coextensive section.

2. An apparatus according to claim 1 further including: an appropriate weave-fill coupled to said cords and said elastic warp bogies in said coextensive section and to said cords in said first section to assure sufficient flexibility and to maintain the spatial disposition of said cords and said elastic warp bogies in said coextensive section and said cords in said first section.

3. An apparatus according to claim 2 in which said elastic warp bogies in said coextensive section have a sufficient longitudinal dimension and are selected from materials to allow said exaggerated sine-wave-shape of said cords to be pulled into a tensile load bearing configuration.

4. An apparatus according to claim 3 in which said cords are of a length to limit the length to which the elastic bogies can be stretched and at which degree of stretching at least a part of a towing force is transferred to said cords.

5. An apparatus according to claim 4 in which said elastic sheath is secured to said coextensive section at opposite ends to provide for load sharing with said elastic sheath.

6. An apparatus according to claim 5 in which said strength member has a wall thickness to allow sensing.

7. An apparatus for providing tensile strength for an elastic sheath comprising:

primary bearing means disposed contiguously adjacent to and on the inside of said elastic sheath for longitudinally extending the length thereof, the primary bearing longitudinally extending means reaches from one end of the end of the sheath to the other and is secured thereto and defines an elongate chamber therein, said primary bearing longitudinally extending means includes elastic warp bogies to provide for an elastic tensile strength capability about the elongate chamber and further includes a plurality of cords disposed in an exaggerated sign-wave configuration and arranged in a side-by-side spaced relationship with respect to one another being located inside of the inner wall of said elastic sheath, and a lateral weave-fill woven among said elastic warp bogies and said cords to maintain a positioning of said elastic warp bodies and said cords.

8. An apparatus according to claim 7 in which said elastic warp bogies have a sufficient longitudinal dimension and are selected from materials to allow the exaggerated sine wave shape of said cords of said primary bearing longitudinally extending means to be straightened out.

9. An apparatus for providing tensile strength comprising:

primary bearing means disposed in an essentially tube-shape for longitudinally extending the length thereof, the primary bearing longitudinally extending means defines an elongate chamber therein and includes a plurality of cords disposed in an exaggerated sign-wave configuration and arranged in a longitudinally extending, side-by-side spaced relationship with respect to one another, elastic warp bogies longitudinally extending adjacent said cords about the elongate chamber, and means disposed coextensively with said elastic warp bogies and said cords of said primary bearing longitudinally extending means for providing structure to position said elastic warp bogies and said cord, the structure providing means is a lateral weave-fill woven among said elastic warp bogies and said cords.

10. An apparatus according to claim 9 in which said elastic warp bogies have a sufficient longitudinal dimension and are selected from materials to allow the exaggerated sine wave shape of said cords of said primary bearing longitudinally extending means to be pulled into a tensile load bearing configuration.

* * * * *